United States Patent
Lambert et al.

(10) Patent No.: US 12,466,659 B2
(45) Date of Patent: Nov. 11, 2025

(54) LINEAR MOTOR CONVEYOR SYSTEM WITH ALTERNATE DRIVE

(71) Applicant: ATS Corporation, Cambridge (CA)

(72) Inventors: Blake Robert Lambert, Cambridge (CA); Albert John Kleinikkink, Cambridge (CA)

( * ) Notice: Subject to any disclaimer, the term of this patent is extended or adjusted under 35 U.S.C. 154(b) by 140 days.

(21) Appl. No.: 18/466,951

(22) Filed: Sep. 14, 2023

(65) Prior Publication Data

US 2024/0083686 A1   Mar. 14, 2024

Related U.S. Application Data

(60) Provisional application No. 63/406,505, filed on Sep. 14, 2022.

(51) Int. Cl.
*B65G 23/23* (2006.01)
*B65G 23/02* (2006.01)
*B65G 54/02* (2006.01)

(52) U.S. Cl.
CPC ............. *B65G 23/23* (2013.01); *B65G 23/02* (2013.01); *B65G 54/02* (2013.01); *B65G 2205/00* (2013.01); *B65G 2811/092* (2013.01)

(58) Field of Classification Search
CPC .... B65G 54/02; B65G 2811/09; B65G 23/23; B65G 23/02
USPC ................................................. 198/805, 619
See application file for complete search history.

(56) References Cited

U.S. PATENT DOCUMENTS

| 4,624,617 | A | * | 11/1986 | Belna | ............... | F16C 32/044 |
| | | | | | | 104/282 |
| 8,397,896 | B2 | * | 3/2013 | Kleinikkink | ......... | B23Q 7/1447 |
| | | | | | | 198/747 |
| 2015/0027860 | A1 | * | 1/2015 | Kleinikkink | ........... | B65G 54/02 |
| | | | | | | 198/867.01 |
| 2022/0242675 | A1 | * | 8/2022 | Hogan | ................... | B65G 54/02 |

FOREIGN PATENT DOCUMENTS

| DE | 202014006420 U1 | * | 12/2015 | ............. | B65G 35/08 |
| DE | 102022120032 B3 | * | 8/2023 | ............. | B65G 54/02 |
| EP | 4067272 A1 | * | 10/2022 | ............. | B65G 23/22 |

* cited by examiner

*Primary Examiner* — James R Bidwell
(74) *Attorney, Agent, or Firm* — Amarok IP Inc.; Neil W. Henderson

(57) ABSTRACT

A linear motor conveyor system with alternate drive. The system includes: at least one linear motor track section; at least one alternate drive track section having the same configuration as the linear motor track section but incorporating an alternate drive mechanism; a plurality of moving elements configured to move along the linear motor track section and alternate drive track section; and a control system for controlling the moving elements to move on the linear motor track section and the alternative drive track section. The alternate drive track section may include: a belt drive including a belt, a belt drive motor and a friction element on the moving element to engage with the belt such that movement of the belt causes the moving element to move along the track section due to friction. The alternate drive track section may alternatively include a simplified linear motor track section.

15 Claims, 13 Drawing Sheets

LINEAR MOTOR CONVEYOR SYSTEM WITH ALTERNATE DRIVE

RELATED APPLICATIONS

This application claims priority from U.S. Provisional App. No. 63/406,505, filed Sep. 14, 2022, which is hereby incorporated herein by reference.

FIELD

The present disclosure relates generally to an alternate drive linear motor conveyor system. More particularly, the present disclosure relates to a linear motor conveyor system having track sections with alternate drive methods.

BACKGROUND

Modern manufacturing and automation systems and processes are becoming more complex, at least in part because these systems and processes are required to be flexible, fast, and accurate over long periods of time. These systems and processes are expected to provide appropriate product quality in short time frames.

As such, manufacturing and automation systems and processes are relying more and more on various conveyor systems to assist with moving parts/products around quickly and efficiently. There are many different types of conveying systems, most of which are designed for different purposes and each having positive and negative characteristics depending on the application in which they are used. For example, some conveyor systems are designed for part/product movement over longer distances but with less control while other conveyor systems are designed for precise control of part/product movement but tend to be more expensive when used over long distances.

As such, there is a need for an improved conveyor system which can make use of different drive systems depending on the application and, in particular, an improved linear motor conveyor system having track sections with alternate drive methods.

SUMMARY

According to one aspect herein, there is provided a linear motor conveyor system with alternate drive, the system including: at least one linear motor track section; at least one alternate drive track section having the same configuration as the linear motor track section and configured to connect with the linear motor track section but incorporating an alternate drive mechanism; a plurality of moving elements configured to move along the linear motor track section and alternate drive track section; and a control system for controlling the plurality of moving elements to move on the linear motor track section and the alternative drive track section.

In some cases, the alternate drive track section may include: a belt drive including a belt and a belt drive motor, wherein the belt drive is provided to the alternate drive track section; and a friction element provided to the moving element to engage with the belt such that movement of the belt causes the moving element to move along the track section due to friction. In this case, the friction element may include two friction elements, one on each side of the moving element in the direction of motion. Also in this case, both the alternate drive track section and the linear motor track section may include a frame with a groove configured to have a belt installed.

In some cases, the linear motor system may further include a moving element position tracking apparatus applied to one or both of the linear motor track section and the alternate drive track section.

In some cases, the alternate drive track section may include: a simplified linear motor track section including a reduced number of drive coils when compared to the linear motor track section, wherein the reduced number of coils are configured to create a magnetic flux travelling wave to move the moving element along the simplified linear motor track section.

In some cases, the alternate drive track section may include: a simplified linear motor track section including a reduced track section controller when compared to the linear motor track section, wherein the reduced track section controller may be configured to create a magnetic flux travelling wave to move the moving element along the simplified linear motor track section.

In some cases, the alternate drive track section may include: a frame that is similar to a frame of the linear motor track section; and one or more rails that are similar to one or more rails of the linear motor track section, wherein the alternate drive mechanism is a simplified linear motor. In this case, the simplified linear motor may include: a reduced number of drive coils when compared to the linear motor track section; a reduced track section controller when compared to the linear motor track section; and a simplified moving element position tracking apparatus when compared to the linear motor track section.

In some cases, the control system may include a plurality of track section controllers configured for linear motor track sections or alternate drive track sections and the plurality of track section controllers hand-off control of moving elements between linear motor track sections and alternate drive track sections.

In some cases, the system may further include an accumulator system for queuing moving elements on the alternate drive track section. In this case, the accumulator system may include: a stopper mechanism provided to the alternate drive track section; and a stopper plate provided to the moving element that is engaged by the stopper mechanism to hold the moving element and overcome the alternate drive mechanism. Also in this case, the system may further include an accumulator track on which the accumulator system moves to allow adjustment of a position of a queue of moving elements.

According to another aspect herein, there is provided a method for driving a linear motor conveyor system, the method including: driving select coils of a linear motor conveyor to create a magnetic flux travelling wave to move a moving element along the linear motor conveyor.

Other aspects and features of the embodiments of the system and method will become apparent to those ordinarily skilled in the art upon review of the following description of specific embodiments in conjunction with the accompanying figures.

BRIEF DESCRIPTION OF FIGURES

Embodiments of the system and method will now be described, by way of example only, with reference to the attached Figures, wherein.

DETAILED DESCRIPTION

The following description, with reference to the accompanying drawings, is provided to assist in understanding the example embodiments. The following description includes various specific details to assist in that understanding but these are to be regarded as merely examples. Accordingly, those of ordinary skill in the art will recognize that the various embodiments described herein and changes and modifications thereto, including the use of elements of one embodiment with elements of another embodiment, can be made without departing from the scope and spirit of the appended claims and their equivalents. In addition, descriptions of well-known functions and constructions may be omitted for clarity and conciseness.

The terms and words used in the following description and claims are not limited to their bibliographical meanings but are meant to be interpreted in context and used to enable a clear and consistent understanding.

Generally, the present document provides for a conveyor system with an alternate drive and, in particular, a linear motor conveyor system with track sections having alternate drives. The alternate drives include a belt drive section and a standing wave drive. The present document also includes a method for providing an alternate drive in a linear motor conveyor system. Embodiments of the system and method herein allow for different types of drives to be combined together on a similar platform so that there is more flexibility in conveyor design.

The following description will focus on a linear motor conveyor. As described in more detail below, linear motor conveyor systems in an automation environment will typically have a plurality of automation stations placed along the conveyor system.

Figure 1:
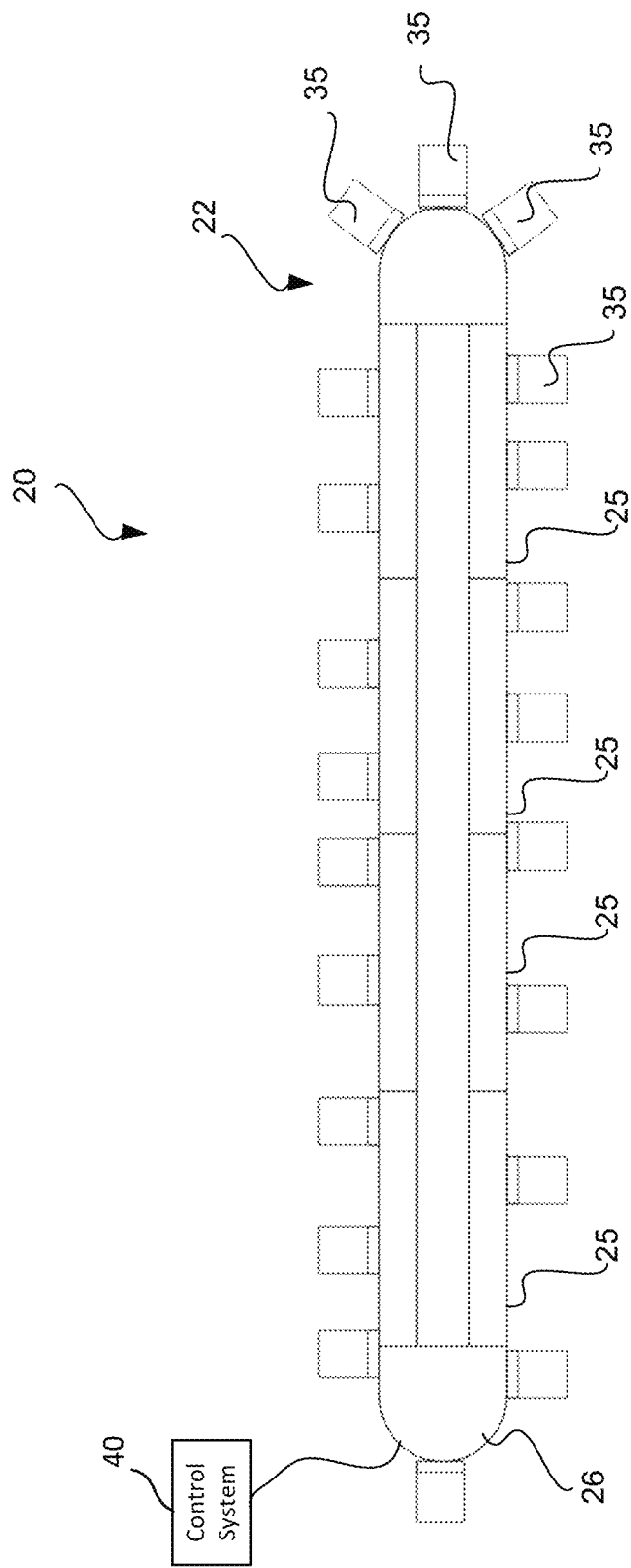
FIG. 1 is a schematic diagram of an example of a conveyor system.

FIG. 1 shows a schematic diagram of an example conveyor system 20. The conveyor system 20 includes a track 22 made up of one or more track sections 25, 26 defining the track 22. In FIG. 1, a plurality of straight track sections 25 are provided with two curved sections 26. A plurality of moving elements 35 are provided to the track and move around on the conveyor system 20. The moving elements 35 may support directly or include or support a pallet which may support a part, product, workpiece or the like (called a "part"). In this disclosure, the terms "moving element" and "pallet" may sometimes be used interchangeably, depending on the context.

It will be understood that the modular nature of the track sections allow for various combinations of track sections to provide various sizes and shapes of linear motor conveyors and any appropriate number of moving elements. In FIG. 1, the corner (or curved) track sections 26 are 180 degree turns but, in some configurations, the curved track sections 26 may have different angles such as 45, 90, 135 degree angles or the like. Some of the principles of operation of a particular type of linear motor conveyor system are described in more detail in, for example, U.S. Pat. No. 8,397,896 to Kleinikkink et al., which is hereby incorporated herein by reference.

As noted, the conveyor system 20 may include a plurality of track sections 25, 26, which are mechanically self-contained and separable from one another so as to be modular in nature. In order to be modular, each track section 25, 26 may house electronic circuitry and/or mechanical parts for powering and controlling the related track section 25, 26 and/or there may be a controller/control system 40 that controls the related track section or the track 22 overall (only one controller is shown but other controllers for track sections may be included as well). As described further below, in some cases, a track controller may communicate or interface with track section controllers provided for each of the track sections 25, 26. The controller(s) may include a processor that executes a program stored on a machine readable medium. The machine-readable medium may be a part of the controller or at a remote location or the like.

In linear motor conveyor systems, such as the linear motor conveyor system 20 shown in FIG. 1, the track 22 may produce a magnetic force for moving the moving element 35 along the track 22. The magnetic force can also capture, support or hold the moving element 35 on the track 22. The magnetic force is at least partly generated by the interaction of the magnetic flux created by magnetic elements (for example, embedded coils) of the track 22 and magnetic elements (for example, magnets) of the moving element 35.

In addition to the conveyor system, such as that shown in FIG. 1, a full manufacturing/automation system will also include automation stations, which are typically arranged adjacent to the conveyor system and are used to handle manufacturing operations on parts moving along the conveyor system. An automation station may include a single piece of equipment/machine in a production line, such as a press, pick & place device or the like, but may also include a complex system involving robots, manipulators, and the like. Generally speaking, automation stations/equipment will have various requirements that need to be met to operate efficiently in relation to the conveyor system.

Figure 2:
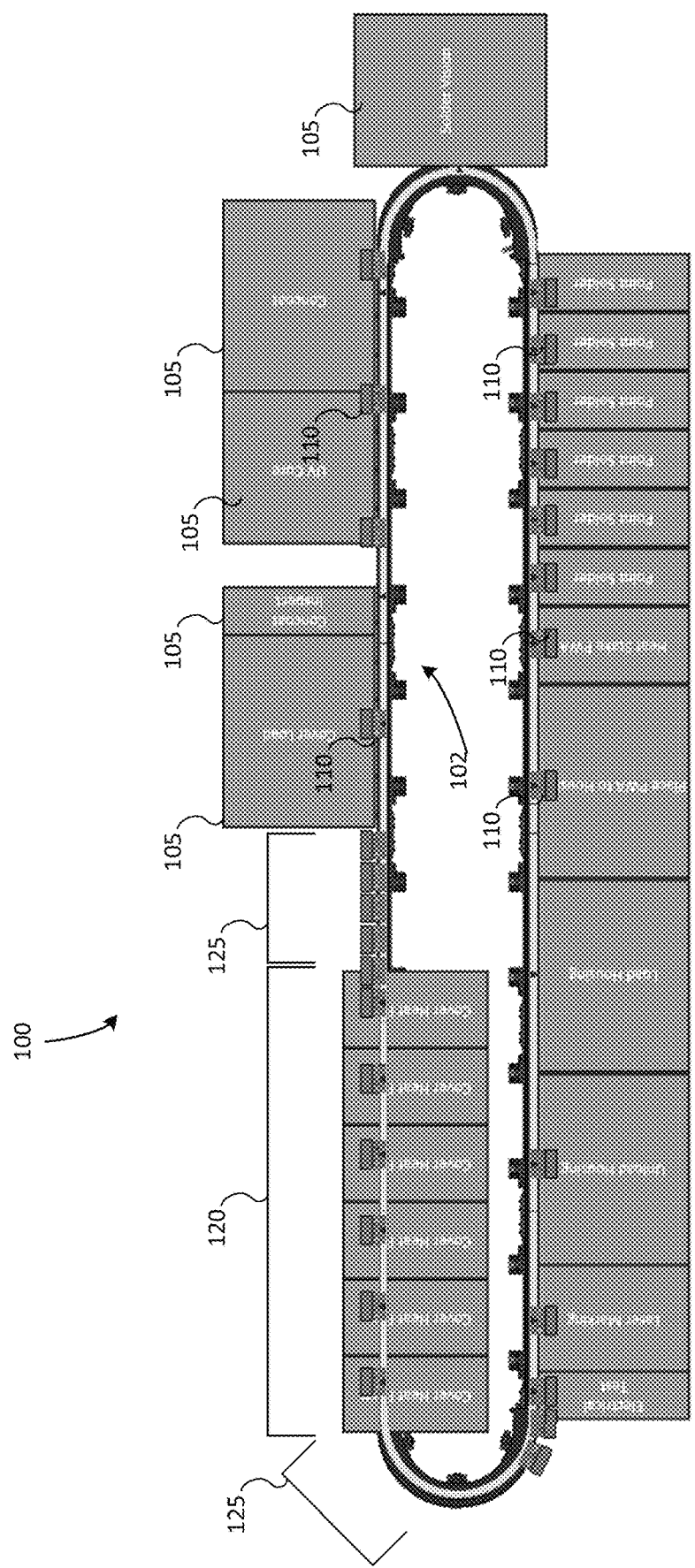
FIG. 2 is a schematic diagram of an example automation system including a conveyor system and various automation stations.

FIG. 2 shows an example configuration of an automation system 100, including a conveyor system 102 and at least one automation station 105. In this case, the conveyor system 102 is a linear motor conveyor system including a track providing a linear motor that drives moving elements along the track using magnetic fields. At least one automation station, or automation element, 105 (which in the current example includes 23 automation stations 105) may be or include, for example, machines, sensors, servos, devices, or equipment, or a combination of machines, devices, or equipment, or the like. Each automation station 105 may require a certain amount of processing time and may further include various parameters related to their operation. As can be seen from FIG. 2, various types of automation stations may be needed and these automation stations may come from a variety of manufacturers. Each automation station will perform an operation or operations on a part as it moves along the conveyor system.

The conveyor 102 includes moving elements 110 that are configured to travel on the conveyor 102, stopping at one or more target set points ("targets") that relate to various automation stations 105 in order to have the automation station operation/function applied to a part being carried by the moving element 110. Some of the automation stations 105 will operate in an asynchronous mode or be in an asynchronous area, in which, a moving element 110 will stop at an automation station 105 and the station will operate on a part on the moving element or the like. Generally, in an asynchronous mode, the conveyor system and automation stations 105 can accommodate variable cycle times and loading. However, in some areas, the conveyor system 102 and automation stations 105 may operate in a synchronization mode or synchronization area (indicated as synchronization area 120), in order to achieve higher speed throughput for automation stations that may be controlled by software or mechanical methods to work synchronously. For example, the automation station may be cammed either mechanically or via software—to repeat an action in a predefined manner continuously. These synchronous automation stations would generally have fixed cycle times, which allows for synchronization, for example, by following a master signal (which may be a software signal or the like as described in further detail in the description of FIG. 3). Similarly, moving elements 110 could be configured to follow a predefined motion profile, within the synchronous area 120, based on the master signal. In automation systems 100 where not all automation stations 105 are synchronized in some way, transitioning between an asynchronous area and a synchronous area 120 can sometimes require a merging zone 125. The merging zone 125 can be used to adjust/align/synchronize a moving element 110 to the software master signal so that the moving element can begin a motion profile sequence at the appropriate timing for entering the synchronous area 120. In order for the conveyor system 100 to work well with the various automation stations, various configuration parameters must be managed such that the moving elements will work in synchronization with the operations of the one or more automation stations. This synchronization must generally be accomplished at high speed and over a large number of cycles in order to provide a high throughput while reducing any bottlenecks. Further, the moving elements 110 are intended to move from position to position without colliding and ensuring proper orientation for processing at each automation station.

Figure 3:
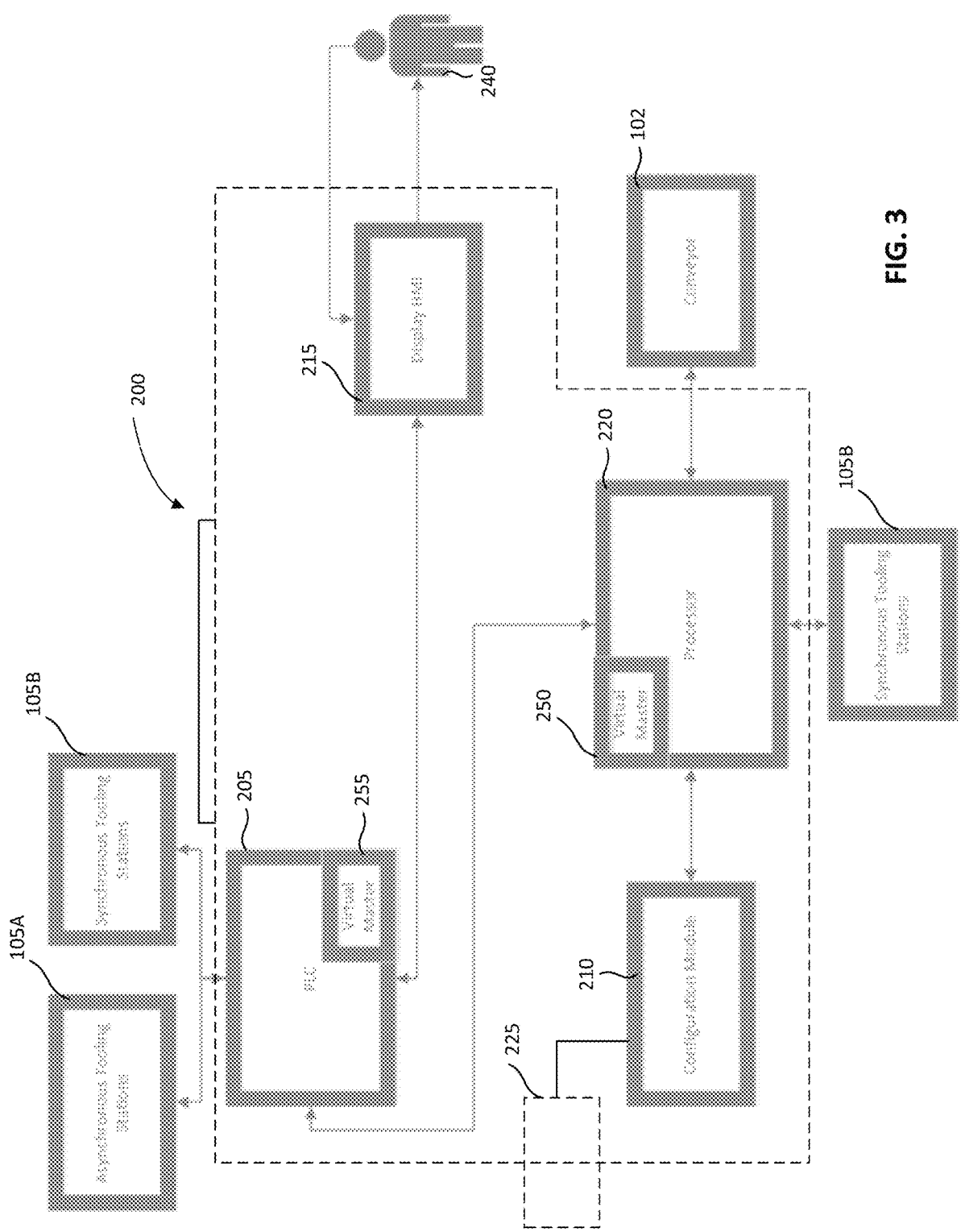
FIG. 3 is a block diagram illustrating an embodiment of a system for managing an automation system.

FIG. 3 illustrates a system 200 for managing automation systems. As noted above, the automation system 100 that is managed by the system 200 may include a conveyor 102 and a plurality of automation stations 105 and, further, the automation stations 105 may be in asynchronous areas/zones (automation stations 105A) or synchronous areas/zones (automation stations 105B). The system 200 includes one or more programmable logic controllers (PLC) 205 (which are typically associated with an automation station or a track section and control the elements of the automation station or of the track section), a configuration module 210, a display/interface 215, and at least one processor 220. The configuration module 210 may include a connection to an internal or external data source, such as a database 225 or the like.

The PLC 210 and the processor 220 can be configured to allow input of and/or receive data related to various parameters related to the automation system. For example, there may be a display/interface (human machine interface (HMI)) 215 for a user 240 to input data related to the automation system, including the conveyor and the automation stations. In some cases, there may be access to one or more outside data sources 225, via, for example the configuration module 210, for data from third party data sources, for automation station/equipment parameters and the like. The configuration module 210 may obtain various parameters from the database 225 such as, for example, previously saved data relating to known or previously input automation system elements or the like. The input or received data may be stored in the database 225 or the like. As will be understood, the database 225 may be distributed across one or several memories and may be accessed via a network or the like.

The configuration module 210 is configured to review the input data to determine the parameters related to configuration of the automation system. The configuration module 210 takes input data, for example, relating to manufacturer, product name/number, functionality, or the like and prepares a configuration of the automation system that will account for communication protocol conversion, latency times, and the like. The configuration module 210 may also allow for further input and adjustments to be made by, for example, a user or users 240. Generally, the configuration module 210 is configured to review the input data and configuration parameters and make adjustments so that the automation stations and conveyor can be in communication and synchronously controlled (i.e. move in a synchronous manner under the control of a master signal) in synchronous zones/areas.

The display/interface 215 provides output information to the end user 240. The processor 220 processes data from the PLC 205 and provides processing power to the configuration module 210 for performing embodiments of the method of managing automation systems described herein. The processor 220 also provides output to the display.

Each of the PLC 205 and the processor 220 may include a master control to provide the master control signal used in synchronous areas. The master control may be in hardware or software (virtual). In this example, the processor 220 includes a virtual software processor master 250. The PLC 205 may also have a PLC virtual master 255, which can be used in the event of external master control (where the master control will 'propagate' a master control signal/information to the processor (more information on this process is describe below with regard to FIG. 3, including the state machine/elements involved). In some cases, the PLC will set and control the virtual master in the processor. The PLC will also generally control asynchronous areas and the asynchronous automation stations 105A. In the event of external master control (as described with FIG. 3) the PLC can control synchronized areas and synchronized automation stations 105b, otherwise the processor can control the synchronized areas and synchronized automation stations 105B. The configuration module 220 may be further enhanced via machine learning, artificial intelligence or the like based on results from previous configurations.

Figure 4:
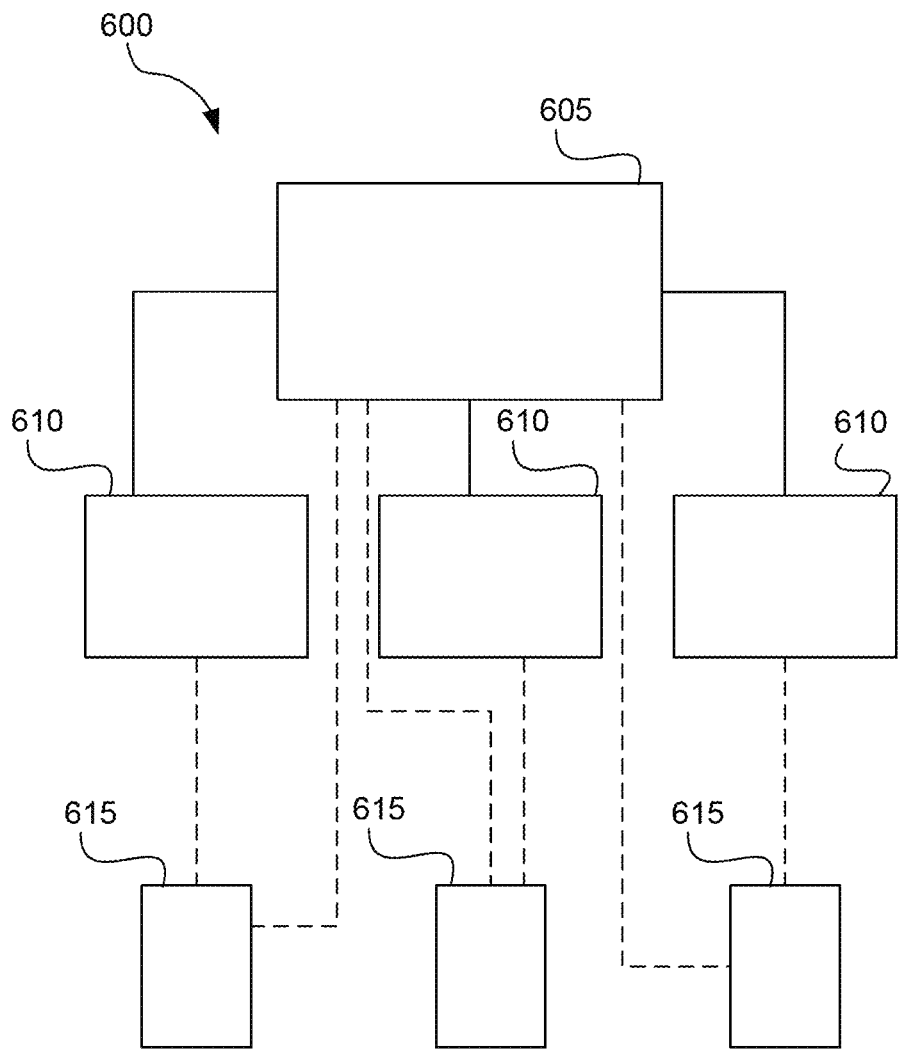
FIG. 4 is a block diagram illustrating an embodiment of a control structure for a linear motor conveyor system.

FIG. 4 is a block diagram of an example embodiment of a control system 600 for the conveyor system 20. As shown in FIG. 1, the conveyor system 20 includes a controller 40. In some cases, the controller 40 may include a central controller 605 that controls the overall conveyor system 20. The conveyor system may also include a plurality of track section controllers 610, for example, one for each of the track sections 25, 26. Either the central controller 605 or the track section controller 610 may also control an accessory on the moving element or an accessory controller 615 provided to control the operation of the accessory. There may be control signals in both directions between the controllers. It will be understood that, in some cases, the movement of the moving element may be controlled to work in relation to or in synchronization with the control of the accessory for co-ordinated operations or the like.

In some embodiments, the track section controllers 610 may be connected to one another in a peer-to-peer communications network such that, for example, each section controller 610 may be connected to preceding and following section controllers 610 through a communications link or the like, rather than each section controller being connected to the central controller. Some alternative embodiments may include use of the central controller 605 to convey information/data between/among section controllers 610 and/or accessory controllers 615 or the like.

The various controllers may be connected via, for example, input/output (I/O) or network modules or the like. The controllers may provide instructions to both the accessories and the track section 25, 26/moving element 35, such as directing the next destination for a moving element 35 along the track, providing instructions to operate in a specific way depending on the location of the moving element on the track section, or the like. In some cases, the controllers can also communicate with the accessory provided on the moving element in a wireless manner. In some cases, it may also be useful to communicate with or among track section controllers in a wireless manner.

Figure 5A:
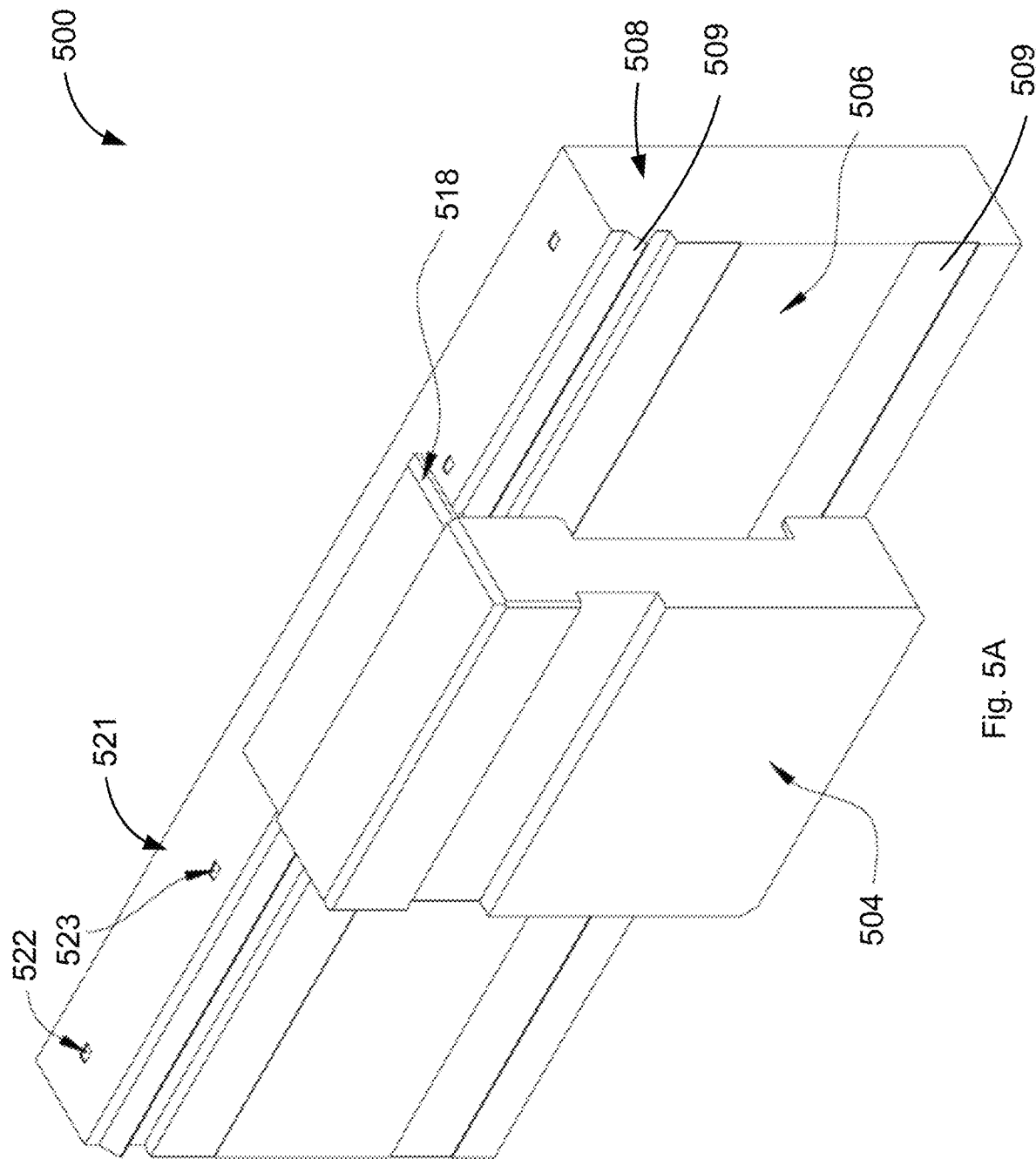
FIG. 5A is a perspective view an embodiment of a linear motor track section.

FIG. 5A is a view of a track section 500 such as that of the linear motor conveyor system 102 of FIG. 2. The track section 500 features one or more moving elements 504 (only one is illustrated) which are configured to ride or travel along a track 506 of the track section 500. The track 506 includes a frame 508 configured to support the moving element 504. The track 506 includes one or more rails 510, in this case two, that support the moving element on the track 506. Some of the principles of operation of a similar track section are described in more detail in U.S. Pat. No. 8,397,896 to Kleinikkink et al., which is hereby incorporated herein by reference. In this particular case, the conveyor system is a linear motor conveyor system Each track section 500 can be mechanically self-contained and quickly and easily separable from one another so as to be modular in nature. In this modular example, the track sections 500 are mounted on a support (not shown) so as to align and abut one another in order to form a longer track. In order to be modular, each track section 500 may house self-contained electronic circuitry for powering and controlling the track section 500 and/or the moving element 504. As noted in FIG. 1, the conveyor system 20 may also include curvilinear track sections 26.

Figure 5B:
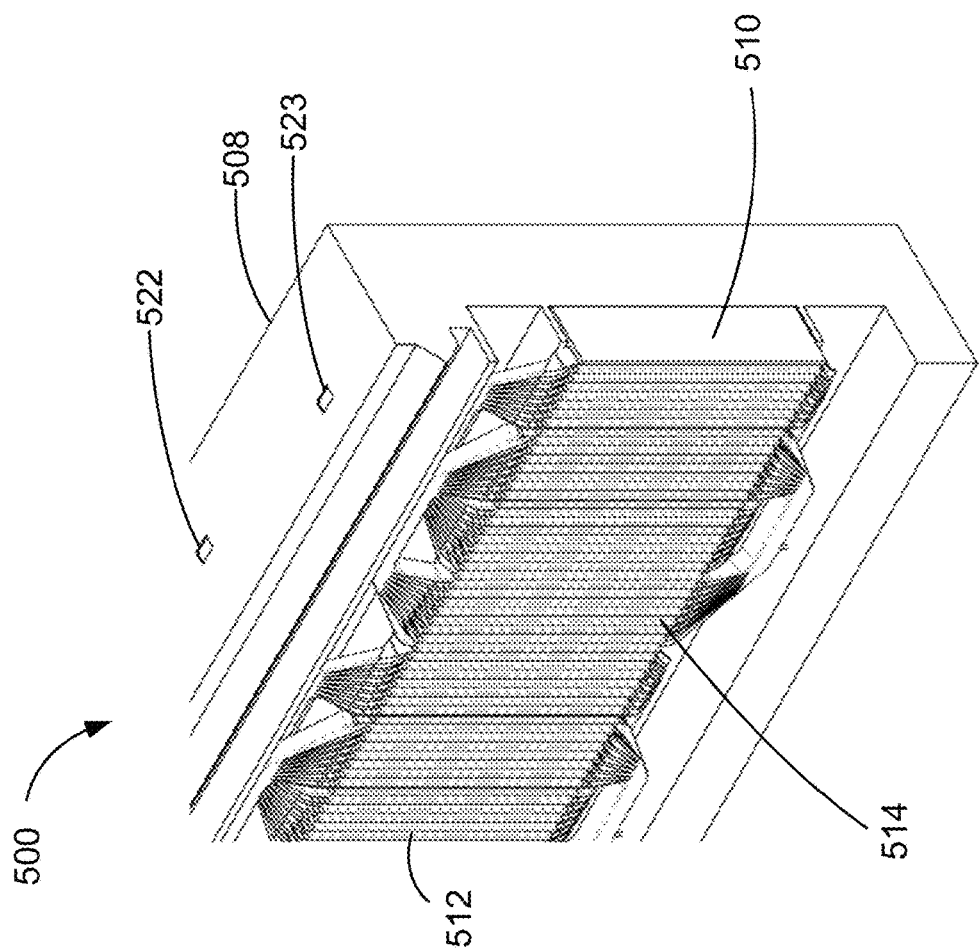
FIG. 5B is a perspective open view of the linear motor track section of FIG. 5A.

FIG. 5B illustrates a perspective open view of the track section 500. The track section 500 includes the frame 508 that houses a linear drive mechanism 510. The linear drive mechanism 510 is formed as a stator armature 512 and a plurality of embedded coils 514. The embedded coils 514 can be individually excited so that an electrically-induced magnetic flux produced by the stator armature 512 is located adjacent to a given moving element 504 to be controlled, in a direction normal thereto, without affecting adjacent moving elements 504. The motive force for translating each moving element 504 arises from the magnetomotive force (MMF) produced by elements (not shown), such as permanent magnets, provided to each moving element 504 and the stator armature 512, i.e., by the tendency of the corresponding magnetic fluxes provided by the stator armature 512 and moving element 504 to align. A track section controller (such as those described above) enables separate and independent moving MMFs to be produced along the length of the track section 500 for each moving element 504 so that each moving element 504 can be individually controlled with a trajectory profile that is generally independent of any other moving element 504. Structurally, the track section 500 may thus be broadly classified as a moving-magnet type linear brushless motor having multiple moving elements 504.

Referring again to FIG. 5, in this particular embodiment, each moving element 504 includes an extension 518 provided with a machine readable medium (not shown), which may be, for example, a magnetic strip, an optically transmissive or reflective strip, other type of feedback system or the like. The extension 518 is configured such that the machine readable medium interacts with sensors 522, 523 provided to the frame 508. The sensors 522, 523 are configured to read the machine readable medium, whether magnetically, optically, or otherwise. The machine readable medium and sensors 522, 523 form a position sensing system 521.

Figure 6:
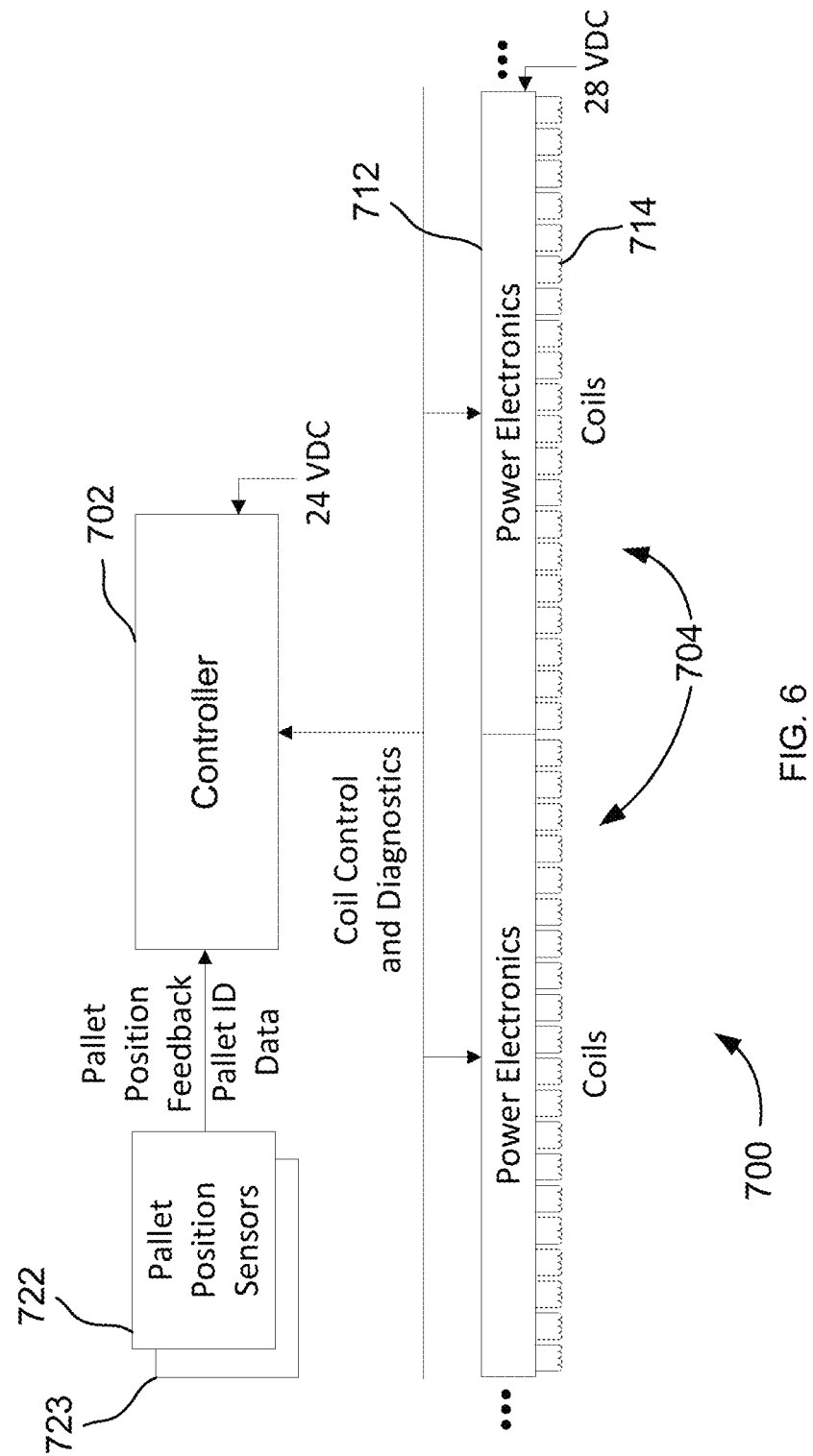
FIG. 6 is a block diagram of an embodiment of a control architecture for a linear motor conveyor system.

FIG. 6 is a block diagram of an example control architecture 700 employed in a conveyor system 20, 102, such as that in FIG. 1 or 2. Controller 702 controls the conveyor system and the track sections 704 (two are illustrated). The controller 702 is configured to monitor the position of and control the movement of moving elements (not shown) based on the position. The controller 702 may also monitor and report moving element identification data so the moving element identifier is known and can be tracked throughout the conveyor system. As such, the controller 702 may be used for process (i.e. manufacturing-line) control. The controller 702 may also provide a supervisory diagnostic role by monitoring the track sections 704 (e.g., by engaging in a continuous polling or pushing process) in order to determine the current status of any track section 704 and whether any track section 704 has failed. It will be understood that, in some cases, there may be additional controllers 702 and each may directly control each of the track sections 704.

The controller 702 may also be connected to other devices, such as programmable logic controllers (PLCs) (not shown) via input/output (I/O) or network modules. The PLCs may provide manufacturing-line station-processing instructions to the track section 704, such as directing the next destination for a moving element along the track, or providing station-specific motion instructions in respect of a given moving element.

As illustrated, the controller 702 can be connected to a stator armature 712 and coils 714 in the track sections 704 and controls the coils 714 in accordance with an independent trajectory or "move" command for each moving element located thereon.

The controller 702 may also be connected to a moving element position sensing apparatus, such as sensors 722, 723 situated in the track section 704 that interact with moving elements moving over the sensors. The controller 702 can be configured to implement a closed-loop digital servo control system that controls movement of the moving element by resolving the real-time position of each moving element located in the track section(s) 704. The controller 702 makes use of the sensors 722, 723, which supplies moving element identification data and moving element position data to the controller 702.

One aspect of a linear motor conveyor system of the type described above is that each track section can be relatively expensive due to the ability to provide fine adjustment of the position, speed, acceleration, and the like of the moving elements on the track and, in some cases, of accessories on the moving elements. In order to reduce costs, embodiments herein provide for alternative drive mechanisms/systems on track sections that otherwise have the same form factor/shape/modularity of the track sections described above. In particular, the alternate drive track sections include the same rails for the moving elements to run on and the alternate drive track sections are configured to join easily with the linear motor track sections.

Figure 7:
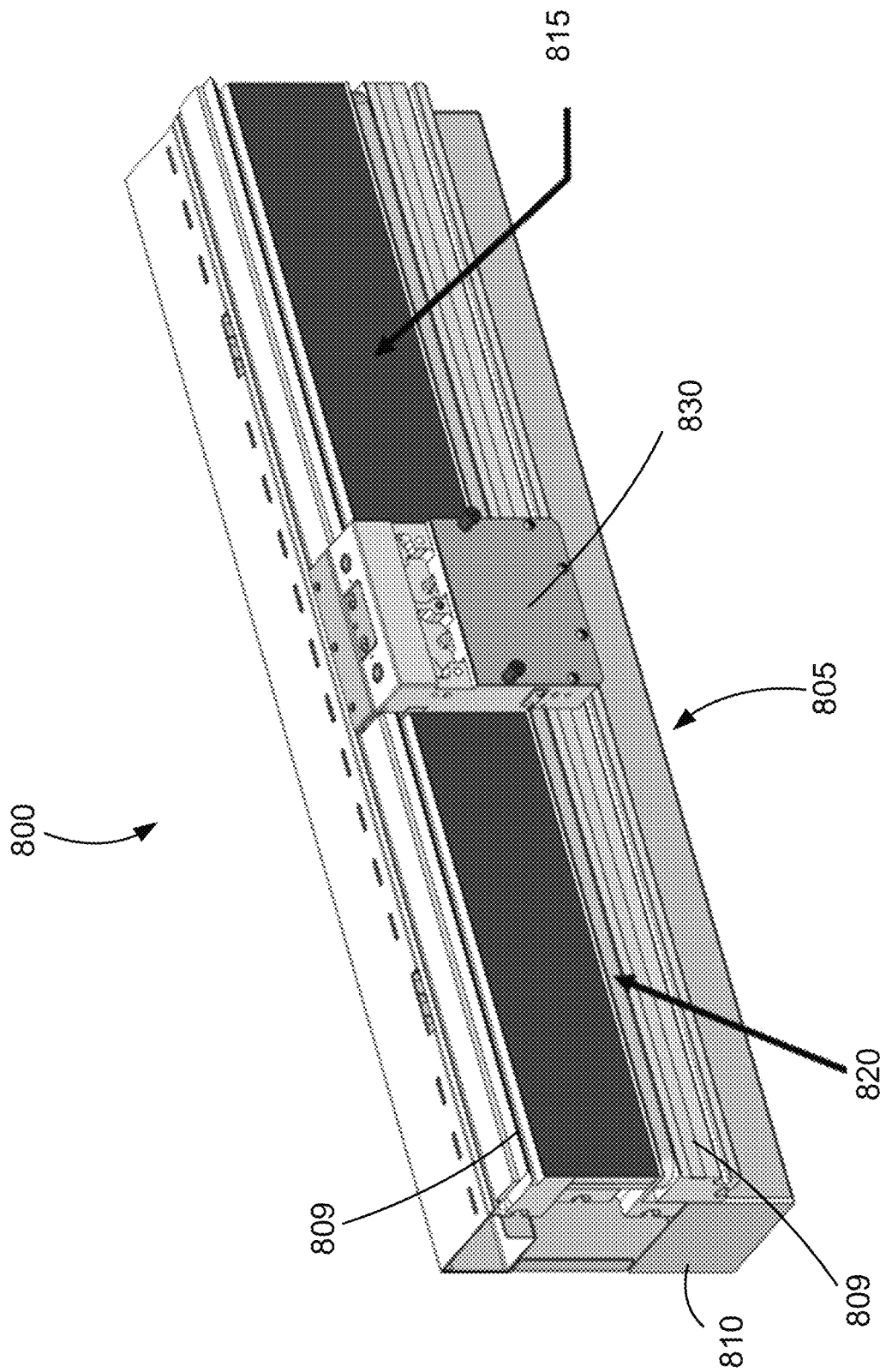
FIG. 7 is a front perspective view of an embodiment of an alternate drive track section.
Figure 8:
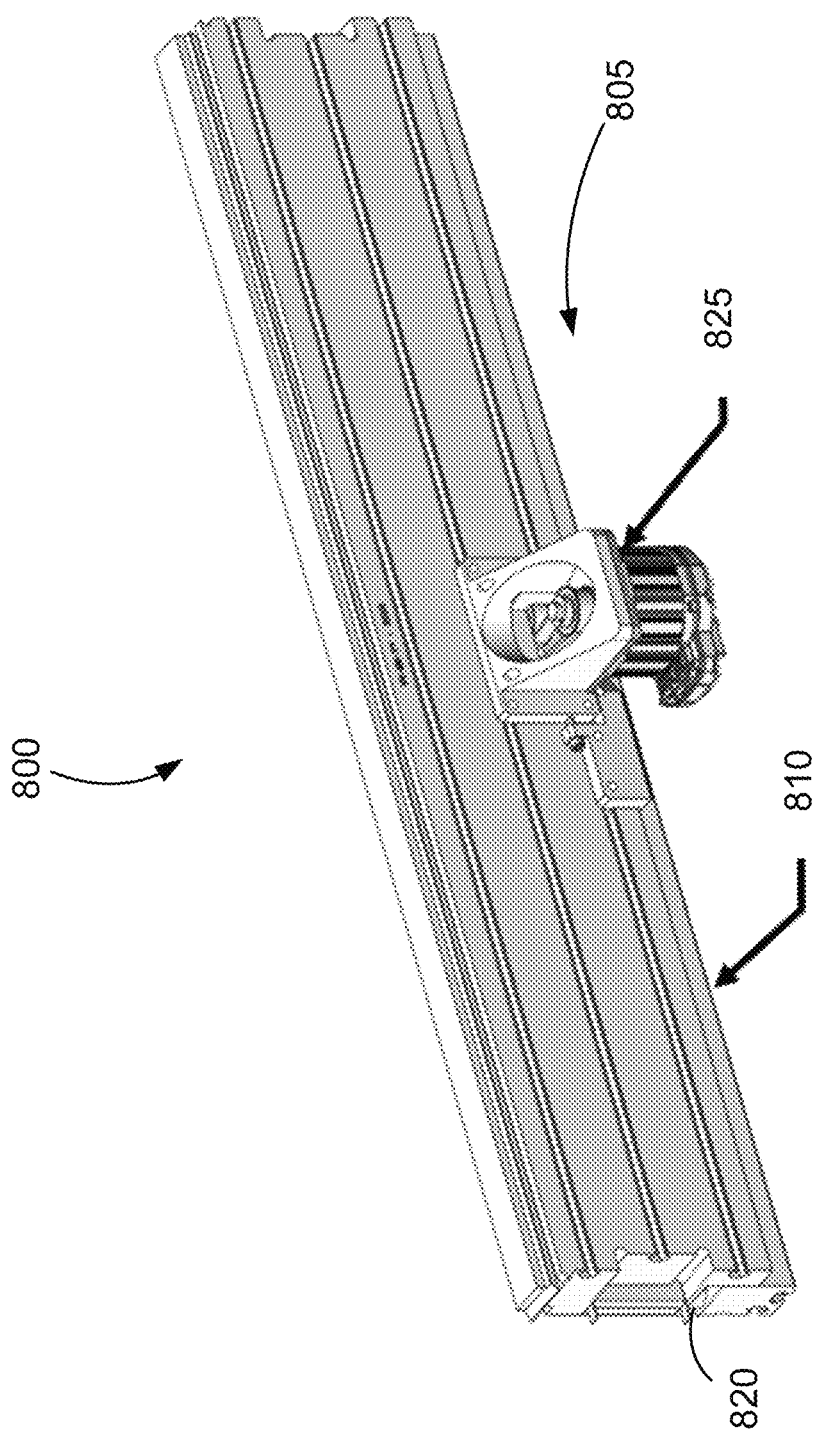
FIG. 8 is a rear perspective view of the alternate drive track section of FIG. 7.

FIG. 7 is a front perspective view of an embodiment of a track section 800 provided with an alternate drive mechanism 805 (alternate drive track section) but having the same form factor and shape as the track section of FIG. 5A (linear motor track section). FIG. 8 is a back view of the track section of FIG. 7. As shown in FIG. 7, a frame 810 and track 815 are generally the same shape as the frame 508 and track 506 of FIG. 5A. In particular, the rails 809 are the same shape and position as the rails 509 of FIG. 5A. The difference is that the alternate drive track section 800 does not have the linear motor drive mechanism (stator armature 512 and coils 514) of the track section 500 of FIG. 5B. Instead, the alternate drive mechanism 805 includes a belt 820 and a belt drive motor 825 (shown in FIG. 8). The alternate drive mechanism (belt drive) 805 interacts with and drives the moving element 830 along the track section 800.

Figure 9:
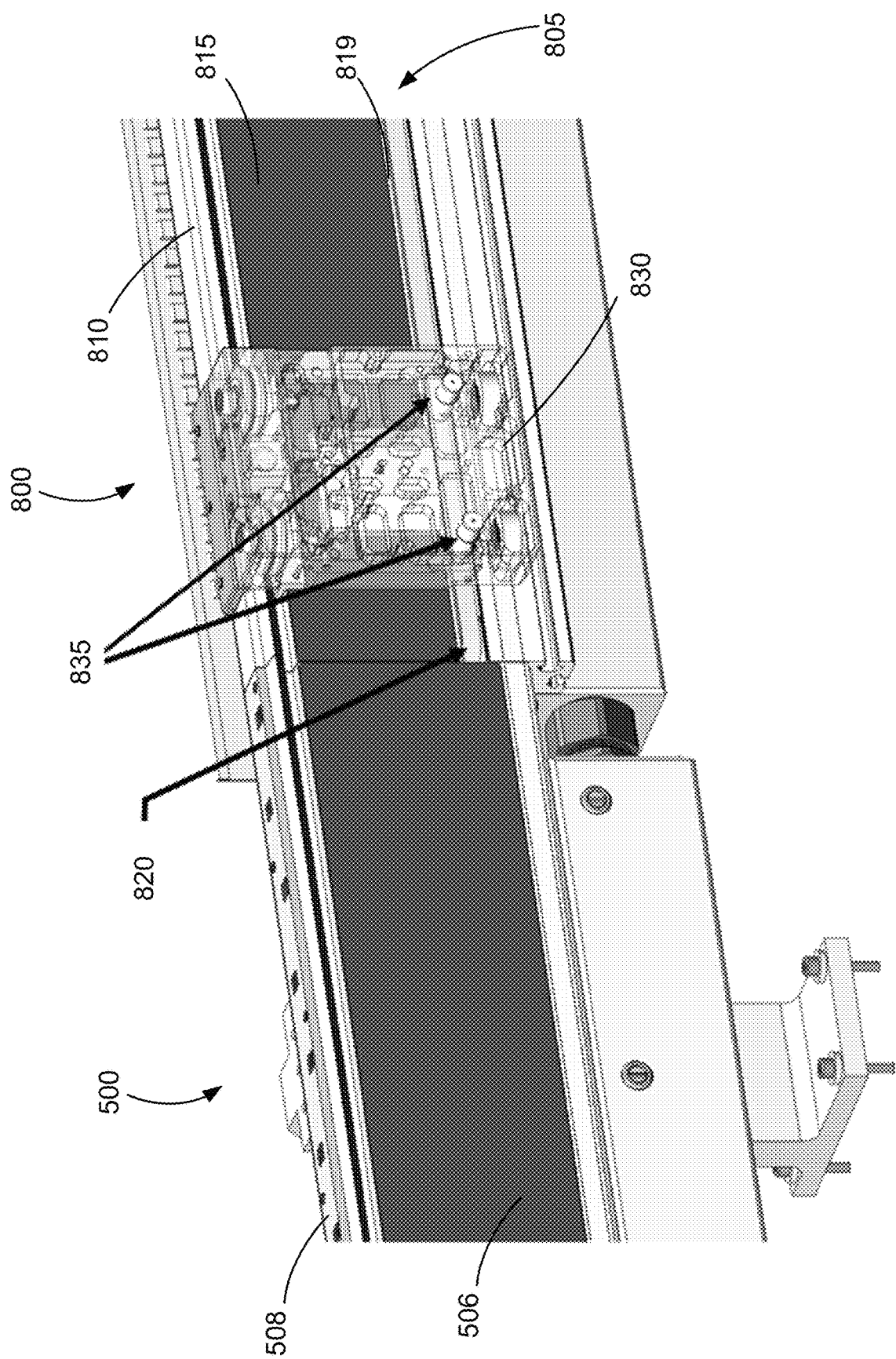
FIG. 9 illustrates a connection between the linear track section of FIG. 5A and the alternate drive track section of FIG. 7.

FIG. 9 illustrates a connection between the linear motor track section of FIG. 5A and the alternate drive track section of FIG. 7. As illustrated, the frame and track surface of each of the track sections meet and connect in a similar way to that in which two linear motor drive track sections such as that in FIG. 5A would meet and connect. In FIG. 9, the alternate drive track section 800 has a groove 819 in which the belt 820 is mounted. While the linear motor track section 500 in FIG. 9 does not have a groove, the linear motor track section 500 could be configured to have a groove so that the frames could be manufactured at the same time. As a leading edge of the moving element moves across the gap, the moving element is still being driven by the linear motor track section but also begins to be driven by the belt of the alternate drive track section. In this particular example, the belt engages with a friction element 835 provided on the moving element. In this embodiment, the moving element includes a friction element located on the moving element, for example, two friction elements proximate the edges of the moving element and configured to contact with the belt 820. The contact between the friction element 835 and the belt 820 is configured such that the moving element is drawn along the track section 800 by the belt 820 by friction. The friction element 835 can be biased toward the belt with a predetermined force in order to provide an appropriate level of friction. At the end of the alternate drive track section 800, the moving element is pushed toward the next track section, which may be another linear motor track section, and picked up by the drive system of the next track section.

In FIG. 9, the alternate drive track section 800 is shown without moving element position sensors for tracking moving element position, in order to conserve costs, however, one of skill in the art will understand that the alternate drive track section 800 could also include an apparatus to track moving element position in a similar or different manner.

Figure 10B:
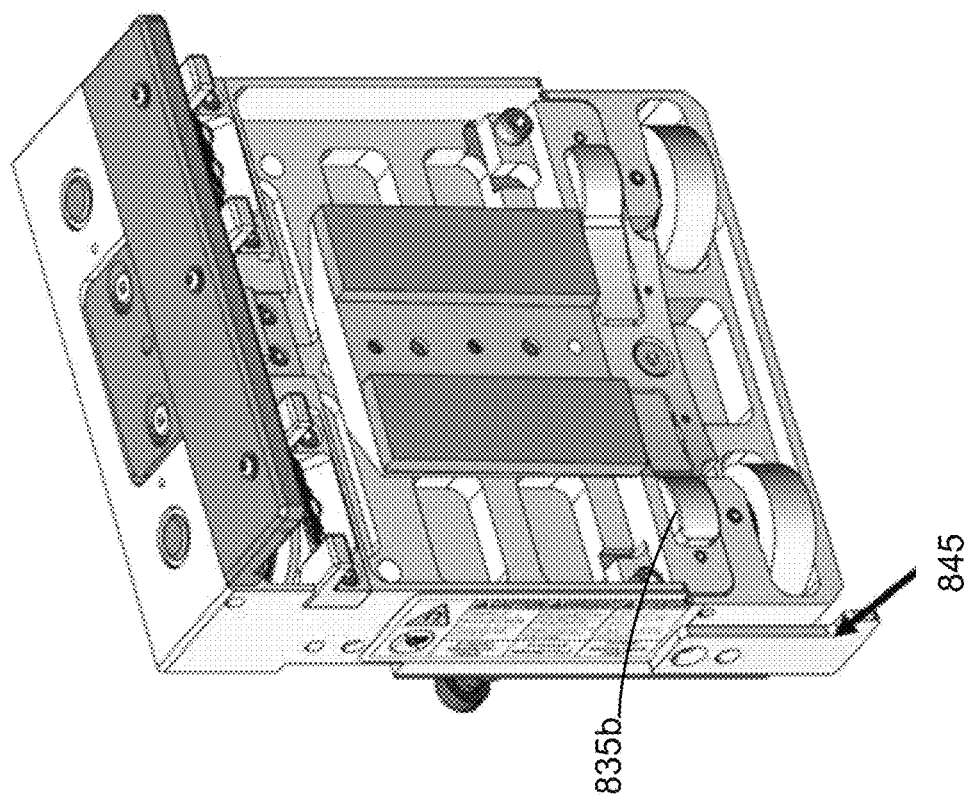
FIGS. 10A and 10B illustrate embodiments of friction elements provided to a moving element.
Figure 10A:
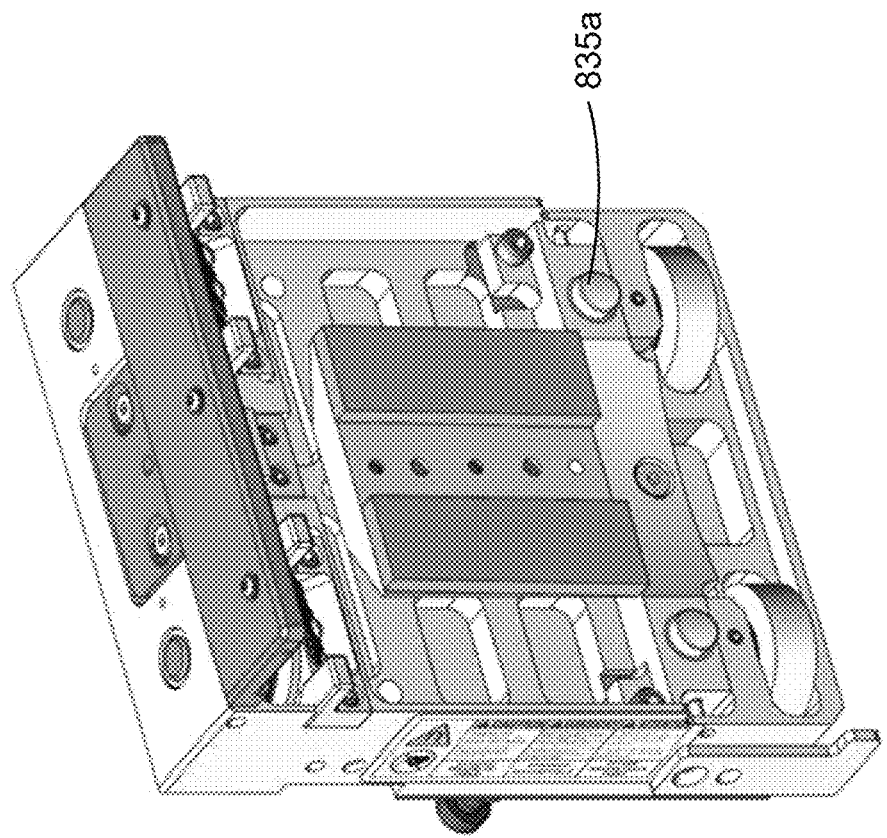

FIGS. 10A and 10B illustrate different embodiments of friction elements 835 that can be provided to the moving element. FIG. 10A illustrates a button 835a that is biased to engage with the belt 820, for example, by being spring loaded. FIG. 10B illustrates a spring loaded lever 835b that engages with the belt 820. In each case, there may be one, two or more friction elements 835 but a convenient arrangement is to have two, one on each side of the moving element (in the direction of motion).

An advantage of using an alternate drive such as the belt drive 805 is that there is a reduced cost for a track section such that belt-driven track sections can be used for areas that do not require controlled motion of the type available on linear motor track sections. For example, the alternative drive can be used on longer sections that are intended primarily to move parts over longer distances, such as between processing areas or the like. There may also be processing areas where speed, acceleration, positioning, or the like is less of a requirement and the cheaper alternative drive track section can be used. One example of this may be when moving elements are queued while waiting for a next step in processing.

Figure 11:
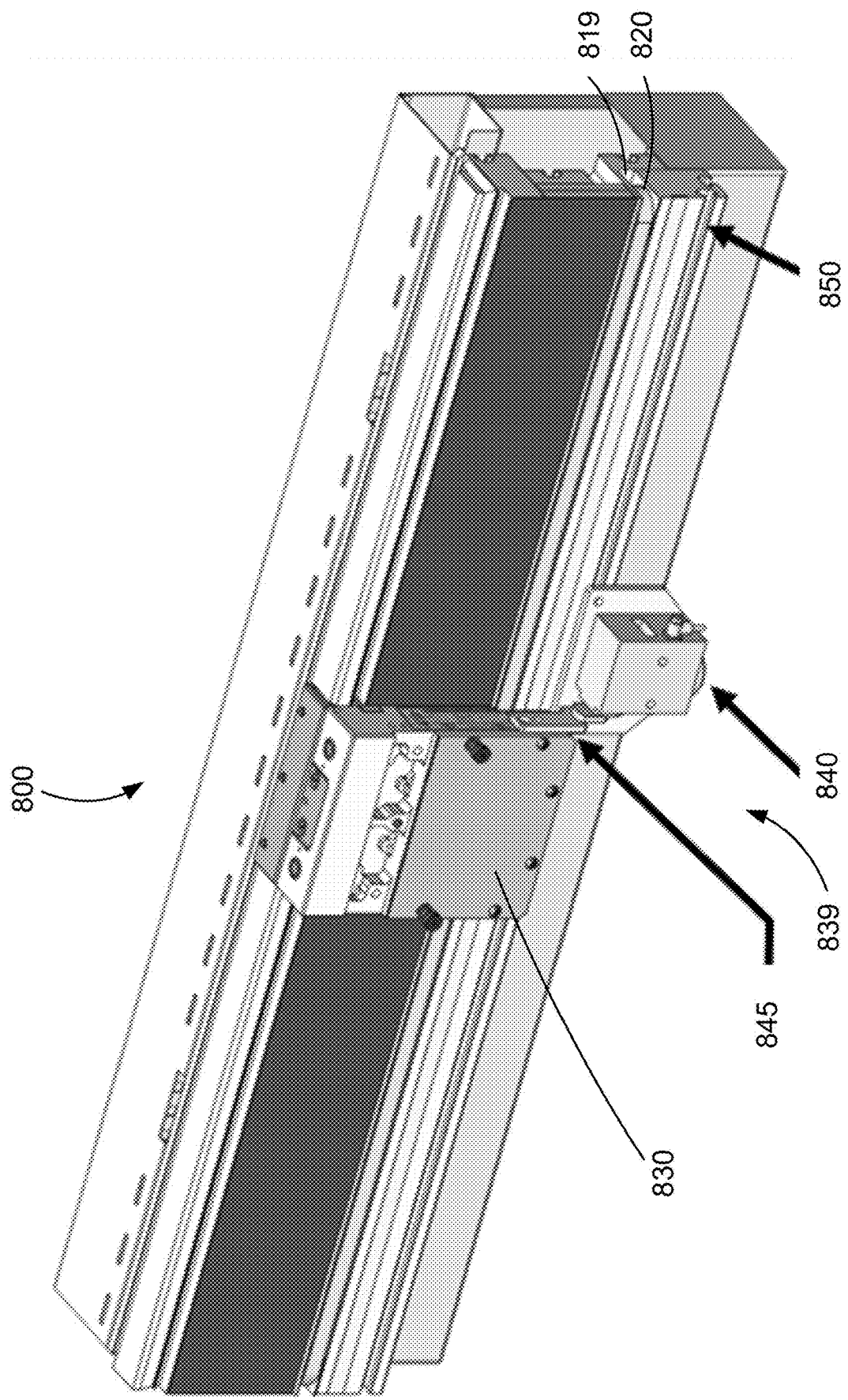
FIG. 11 illustrates an embodiment of an accumulator system for queuing moving elements.
Figure 12:
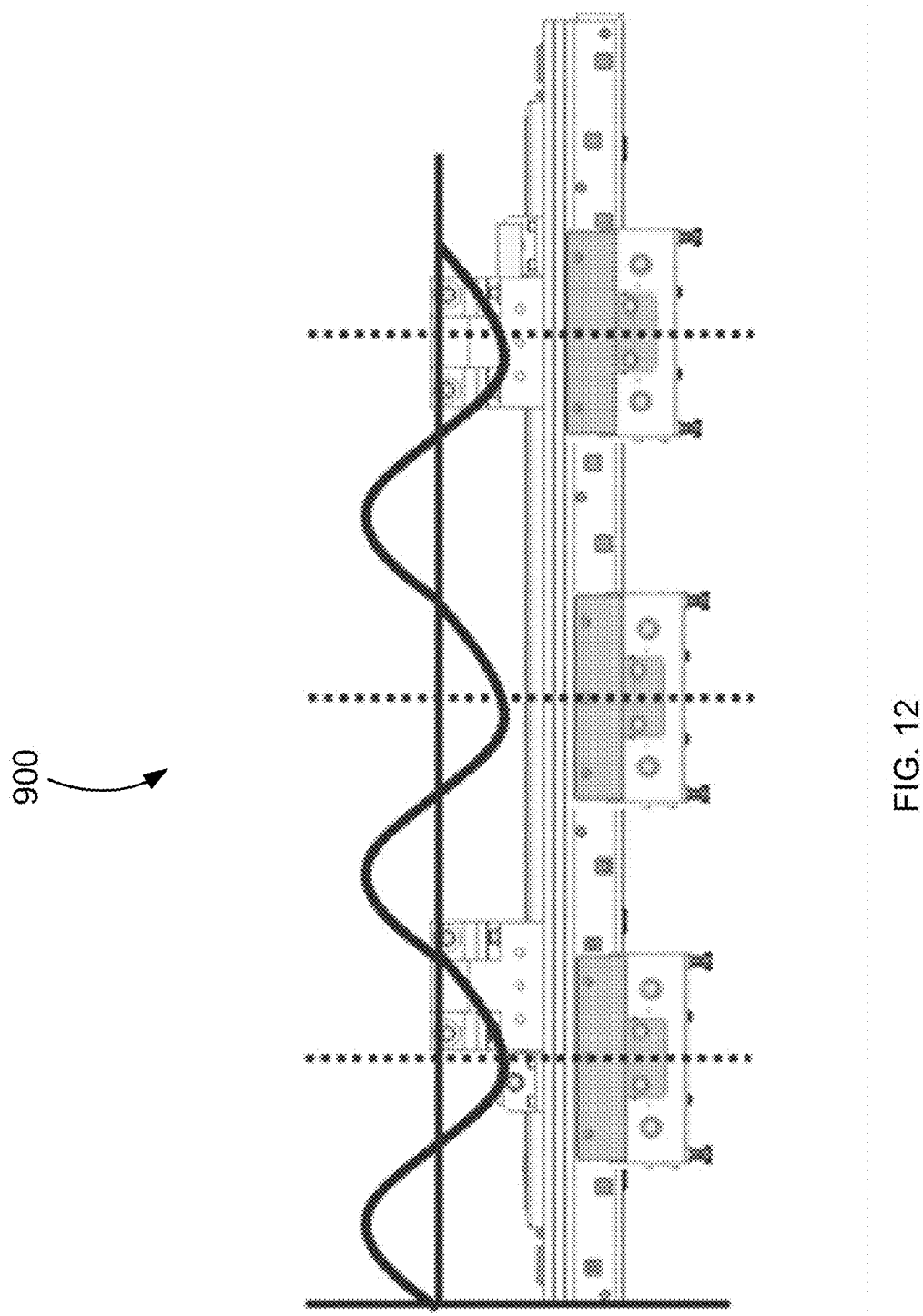
FIG. 12 illustrates a further alternative drive track section.

FIG. 11 illustrates an accumulator system 839 for queuing moving elements that can be used with the alternate drive track section 800. This accumulator system 839 can be used for situations where stopping or queueing of moving elements is needed. In FIG. 11, the accumulator system 839 includes a stopper mechanism 840 that is added to the belt track section and a stopper plate 845 provided to the moving element. The stopper mechanism and stopper extension are configured to hold the moving element stationary by overcoming the force of the belt friction. The stopper mechanism can be operated (turned on and off) by, for example, induction sensors or the like. It will be understood that the stopper plate may extend from the stopper mechanism rather than being provided and/or extended from the moving element or the like. In this illustration, the stopper mechanism 840 is movable on a track 850 so that a position of the stopper mechanism 840 (i.e. accumulator system 839) can be adjusted FIG. 12 illustrates a further alternative drive track section 900 that can be used with a linear motor track section similar to that of FIG. 5A. In this case, the track section may include a stator armature and coils somewhat similar to those of the track section of FIGS. 5A and 5B but does not have as complex a control system in that the coils are powered to produce a travelling wave of electrically-induced magnetic flux along the length of the track section. In this way, a moving element entering onto the travelling wave track section 900 will be moved along the track section 900 at a standard rate based on the travelling wave. In some cases, the track section may also be further simplified by removing encoder electronics and using open loop control. The track section 900 can also include an accumulator system similar to that of FIG. 11. In further cases, the stator armature and coils may be simplified in that a smaller number of coils can be used than would generally be needed in the track section of FIG. 5A.

In this way, there is a new method for driving a linear motor conveyor system according to an embodiment herein in which select coils of a linear motor conveyor are driven in a way to create a magnetic flux travelling wave to move a moving element along the linear motor conveyor. In some cases, the movement may be at a constant speed.

In the preceding description, for purposes of explanation, numerous details are set forth in order to provide a thorough understanding of the embodiments herein. However, it will be apparent to one skilled in the art that these specific details may not be required. In other instances, well-known structures or circuits may be shown in block diagram form in order not to obscure the overall system or method. For example, specific details are not provided as to whether the embodiments described herein are implemented as a software routine, hardware circuit, firmware, or a combination thereof.

Embodiments can be represented as a software product stored in a machine-readable medium (also referred to as a computer-readable medium, a processor-readable medium, or a computer usable medium having a computer-readable program code embodied therein). The machine-readable medium can be any suitable tangible medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment. Those of ordinary skill in the art will appreciate that other instructions and operations necessary to implement the described embodiments can also be stored on the machine-readable medium. Software running from the machine-readable medium can interface with circuitry to perform the described tasks.

The above-described embodiments are intended to be examples only. Elements of one embodiment may be used with other embodiments and not all elements may be required in each embodiment. Alterations, modifications and variations can be effected to the particular embodiments by those of skill in the art without departing from the scope of the invention, which is defined solely by the claims appended hereto.

What is claimed is:

1. A linear motor conveyor system with alternate drive, the system comprising:
    at least one linear motor track section;
    at least one alternate drive track section having the same configuration as the linear motor track section and configured to connect with the linear motor track section but incorporating an alternate drive mechanism;
    a plurality of moving elements configured to move along the linear motor track section and alternate drive track section; and
    a control system for controlling the plurality of moving elements to move on the linear motor track section and the alternate drive track section,
    wherein the alternate drive track section comprises:
        a frame that is similar to a frame of the linear motor track section; and
        one or more rails that are similar to one or more rails of the linear motor track section,
        wherein the alternate drive mechanism is a simplified linear motor.

2. A linear motor conveyor system according to claim 1, wherein the alternate drive track section further comprises:
    a belt drive including a belt and a belt drive motor, wherein the belt drive is provided to the alternate drive track section; and
    a friction element provided to the moving element to engage with the belt such that movement of the belt causes the moving element to move along the track section due to friction.

3. A linear motor conveyor system according to claim 2, wherein the friction element comprises two friction elements, one on each side of the moving element in the direction of motion.

4. A linear motor conveyor system according to claim 2, wherein both the alternate drive track section and the linear motor track section comprise a frame with a groove configured to have a belt installed.

5. A linear motor conveyor system according to claim 1, wherein the linear motor system further comprises a moving element position tracking apparatus applied to one or both of the linear motor track section and the alternate drive track section.

6. A linear motor conveyor system according to claim 1, wherein the alternate drive track section further comprises:
    a reduced number of drive coils when compared to the linear motor track section,
    wherein the reduced number of coils are configured to create a magnetic flux travelling wave to move the moving element along the simplified linear motor track section.

7. A linear motor conveyor system according to claim 1, wherein the alternate drive track section further comprises:
    a reduced track section controller when compared to the linear motor track section,
    wherein the reduced track section controller is configured to create a magnetic flux travelling wave to move the moving element along the simplified linear motor track section.

8. A linear motor conveyor system according to claim 1, wherein the simplified linear motor further comprises:
    a reduced number of drive coils when compared to the linear motor track section;
    a reduced track section controller when compared to the linear motor track section; and
    a simplified moving element position tracking apparatus when compared to the linear motor track section.

9. A linear motor conveyor system according to claim 1, wherein the control system comprises a plurality of track section controllers configured for linear motor track sections or alternate drive track sections and the plurality of track section controllers hand-off control of moving elements between linear motor track sections and alternate drive track sections.

10. A linear motor conveyor system according to claim 1, further comprising an accumulator system for queuing moving elements on the alternate drive track section.

11. A linear motor conveyor system according to claim 10, wherein the accumulator system comprises:
    a stopper mechanism provided to the alternate drive track section; and
    a stopper plate provided to the moving element that is engaged by the stopper mechanism to hold the moving element and overcome the alternate drive mechanism.

12. A linear motor conveyor system according to claim 10, further comprising an accumulator track on which the accumulator system moves to allow adjustment of a position of a queue of moving elements.

13. A linear motor conveyor system according to claim 1, wherein the simplified linear motor further comprises:
    a simplified moving element position tracking apparatus when compared to the linear motor track section.

14. A linear motor conveyor system according to claim 1, wherein the simplified linear motor further comprises:
    a reduced number of drive coils when compared to the linear motor track section.

15. A linear motor conveyor system according to claim 1, wherein the simplified linear motor further comprises:

a reduced track section controller when compared to the linear motor track section.

* * * * *